(12) United States Patent
Cratty

(10) Patent No.: US 6,611,068 B2
(45) Date of Patent: *Aug. 26, 2003

(54) POWER SYSTEM

(75) Inventor: William E. Cratty, Bethel, CT (US)

(73) Assignee: Sure Power Corporation, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/911,258

(22) Filed: Jul. 23, 2001

(65) Prior Publication Data

US 2002/0135233 A1 Sep. 26, 2002

Related U.S. Application Data

(63) Continuation of application No. 09/313,895, filed on May 8, 1999, now Pat. No. 6,288,456.
(60) Provisional application No. 60/085,992, filed on May 19, 1998.

(51) Int. Cl.[7] .................................................. H02J 7/00
(52) U.S. Cl. .......................................... 307/64; 307/68
(58) Field of Search ............................... 307/64–68, 23, 307/84–87, 45, 47; 322/4, 39, 13, 60

(56) References Cited

U.S. PATENT DOCUMENTS

| | | | |
|---|---|---|---|
| 2,194,822 A | | 3/1940 | Dannheiser |
| 2,783,393 A | | 2/1957 | Lindahl et al. |
| 3,243,598 A | | 3/1966 | Grillo |
| 3,514,625 A | | 5/1970 | Lane |
| 3,665,495 A | * | 5/1972 | Carter et al. ................ 307/67 |
| 3,682,563 A | * | 8/1972 | Takashima .................... 415/1 |
| 3,744,246 A | * | 7/1973 | Doerner ........................ 60/685 |
| 3,753,069 A | | 8/1973 | Newton |
| 3,805,139 A | | 4/1974 | Hoffman, Jr. et al. |
| 3,808,452 A | | 4/1974 | Hutchinson |
| 3,996,477 A | * | 12/1976 | Laing ............................ 290/52 |
| 4,195,233 A | * | 3/1980 | Udvardi-Lakos ............ 307/66 |
| 4,203,041 A | * | 5/1980 | Sachs ........................... 307/67 |
| 4,406,950 A | | 9/1983 | Roesel, Jr. |
| 4,412,170 A | | 10/1983 | Roesel, Jr. |
| 4,460,834 A | | 7/1984 | Gottfried |
| 4,465,943 A | | 8/1984 | Risberg |
| 4,471,233 A | * | 9/1984 | Roberts ........................ 307/66 |
| 4,651,020 A | | 3/1987 | Kenny et al. |
| 4,686,375 A | | 8/1987 | Gottfried |
| 4,729,086 A | | 3/1988 | Lethellier |
| 4,733,341 A | * | 3/1988 | Miyazawa .................... 363/71 |
| 4,827,152 A | * | 5/1989 | Farkas ........................... 307/68 |
| 4,857,755 A | | 8/1989 | Comstock |
| 5,053,635 A | | 10/1991 | West |
| 5,081,368 A | | 1/1992 | West |

(List continued on next page.)

FOREIGN PATENT DOCUMENTS

| | | | | |
|---|---|---|---|---|
| DE | 42 15 550 A1 | * | 11/1993 | .............. H02J/9/06 |
| EP | 0 651 493 A1 | * | 5/1995 | .............. H02J/3/00 |
| GB | 1 382 264 | * | 1/1975 | ............ F01K/25/10 |
| GB | 2 281 642 A | * | 3/1995 | .............. H02J/7/34 |
| JP | 3-118735 | * | 5/1991 | .............. H02J/9/08 |
| JP | 4-312318 | * | 11/1992 | .............. H02J/1/10 |
| JP | 5-146095 | * | 6/1993 | .............. H02J/9/00 |
| JP | 7-336894 | * | 12/1995 | .............. H02J/3/38 |
| JP | 8-236134 | * | 9/1996 | ............ H01M/8/04 |
| JP | 11-113176 | * | 4/1999 | .............. H02J/3/38 |

Primary Examiner—Fritz Fleming
(74) Attorney, Agent, or Firm—Cantor Colburn, LLP

(57) ABSTRACT

An exemplary embodiment of the invention is a power system for providing power to a critical load. The system includes a first power source producing sufficient power to supply the critical load and a second power source, independent of said first power source. The second power source produces sufficient power to supply the critical load. The system also includes a rotary device having a first power input circuit and a second power input circuit. The second power source is coupled to the rotary device at the second power input circuit. A transfer switch selectively couples the first power source to the first power input circuit and the second power input circuit.

15 Claims, 9 Drawing Sheets

U.S. PATENT DOCUMENTS

| | | | |
|---|---|---|---|
| 5,097,194 A | * 3/1992 | Walton et al. | 320/128 |
| 5,612,580 A | 3/1997 | Janonis | |
| 5,642,002 A | 6/1997 | Mekanik et al. | |
| 5,646,458 A | * 7/1997 | Bowyer et al. | 307/67 |
| 5,686,766 A | * 11/1997 | Tamechika | 307/43 |
| 5,737,202 A | 4/1998 | Shimamori | |
| 5,783,932 A | * 7/1998 | Namba et al. | 322/16 |
| 5,811,960 A | 9/1998 | Van Sickle et al. | |
| 5,880,536 A | * 3/1999 | Mardirossian | 307/44 |
| 5,896,434 A | 4/1999 | Yoshizumi et al. | |
| 5,939,798 A | * 8/1999 | Miller | 307/64 |
| 5,994,793 A | * 11/1999 | Bobry | 307/64 |
| 5,994,794 A | * 11/1999 | Wehrlen | 307/66 |
| 5,994,795 A | * 11/1999 | Gabillet | 307/66 |
| 6,011,324 A | * 1/2000 | Kohlstruck et al. | 307/64 |
| 6,023,152 A | * 2/2000 | Briest et al. | 323/207 |
| 6,219,623 B1 | * 4/2001 | Wills | 702/60 |
| 6,288,456 B1 | * 9/2001 | Cratty | 307/64 |
| 6,404,075 B1 | * 6/2002 | Potter et al. | 307/64 |
| 2001/0056330 A1 | * 12/2001 | Wills | 702/60 |
| 2002/0109410 A1 | * 8/2002 | Young et al. | 307/64 |
| 2002/0114983 A1 | * 8/2002 | Frank et al. | 429/9 |

\* cited by examiner

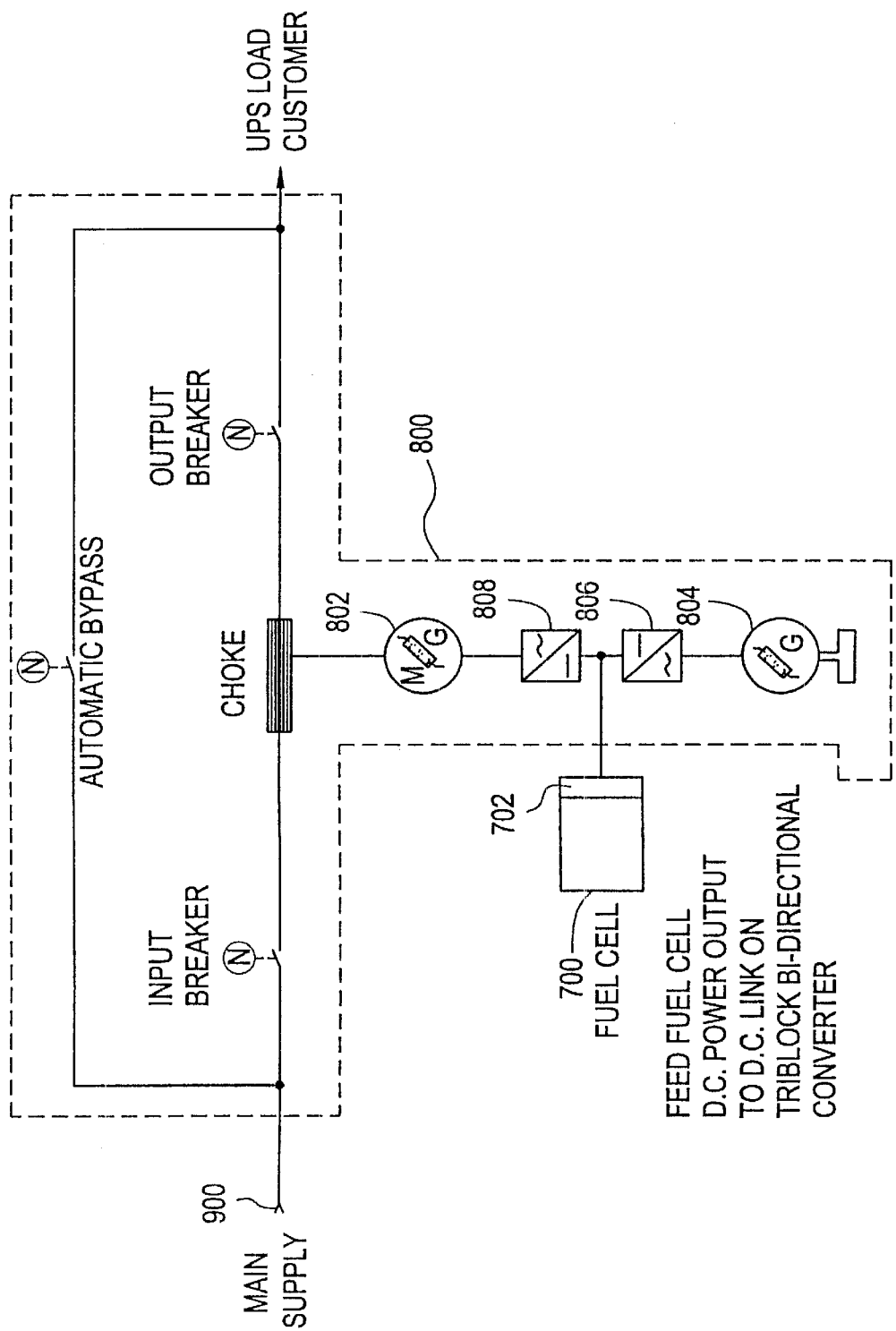

POWER SYSTEM

CROSS-REFERENCE TO RELATED APPLICATIONS

This application is a continuation of U.S. patent application Ser. No. 09/313,895 filed May 8, 1999, now U.S. Pat. No. 6,288,456, the entire contents of which are incorporated herein by reference, and claims the benefit of U.S. Provisional patent application Ser. No. 60/085,992 filed May 19, 1998, the entire contents of which are incorporated herein by reference.

BACKGROUND OF THE INVENTION

The invention relates in general to power systems and in particular to a power system incorporating redundant, auxiliary power sources to provide high reliability power to critical loads. Electronic data processing (EDP) is an increasingly important part of current business operations. Computers are used in all aspects of modern business including conducting transactions, controlling production and maintaining data. If the computers are rendered inoperative, it can cost certain businesses on the order of millions of dollars per minute.

A known cause of computer failure is an interruption in the computer power source. Computers used for EDP are sensitive to power interruptions and even a brief interruption or fault can cause the computer to malfunction. FIG. 1 is a graph of a Computer Business Equipment Manufacturers Association (CBEMA) curve, which has been adopted by the Institute of Electrical and Electronics Engineers (IEEE) as Standard 446-1987, indicating that a computer can tolerate a one half cycle or 8.3 ms power interruption. Power available from existing utility grids (industrial power) cannot meet the high power reliability requirement of modern computer equipment. A business operating and relying upon electronic data processing equipment cannot rely on industrial power given the numerous and lengthy interruptions. Accordingly, high quality power systems are required.

SUMMARY OF THE INVENTION

The above-discussed and other drawbacks and deficiencies of the prior art are overcome or alleviated by the power system of the present invention. An exemplary embodiment of the invention is a power system for providing power to a critical load. The system includes a first power source producing sufficient power to supply the critical load and a second power source, independent of said first power source. The second power source produces sufficient power to supply the critical load. The system also includes a rotary device having a first power input circuit and a second power input circuit. The second power source is coupled to the rotary device at the second power input circuit. A transfer switch selectively couples the first power source to the first power input circuit and the second power input circuit.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 6 is a block diagram of an alternative power source in accordance with the present invention.

DESCRIPTION OF THE PREFERRED EMBODIMENTS

Figure 1:
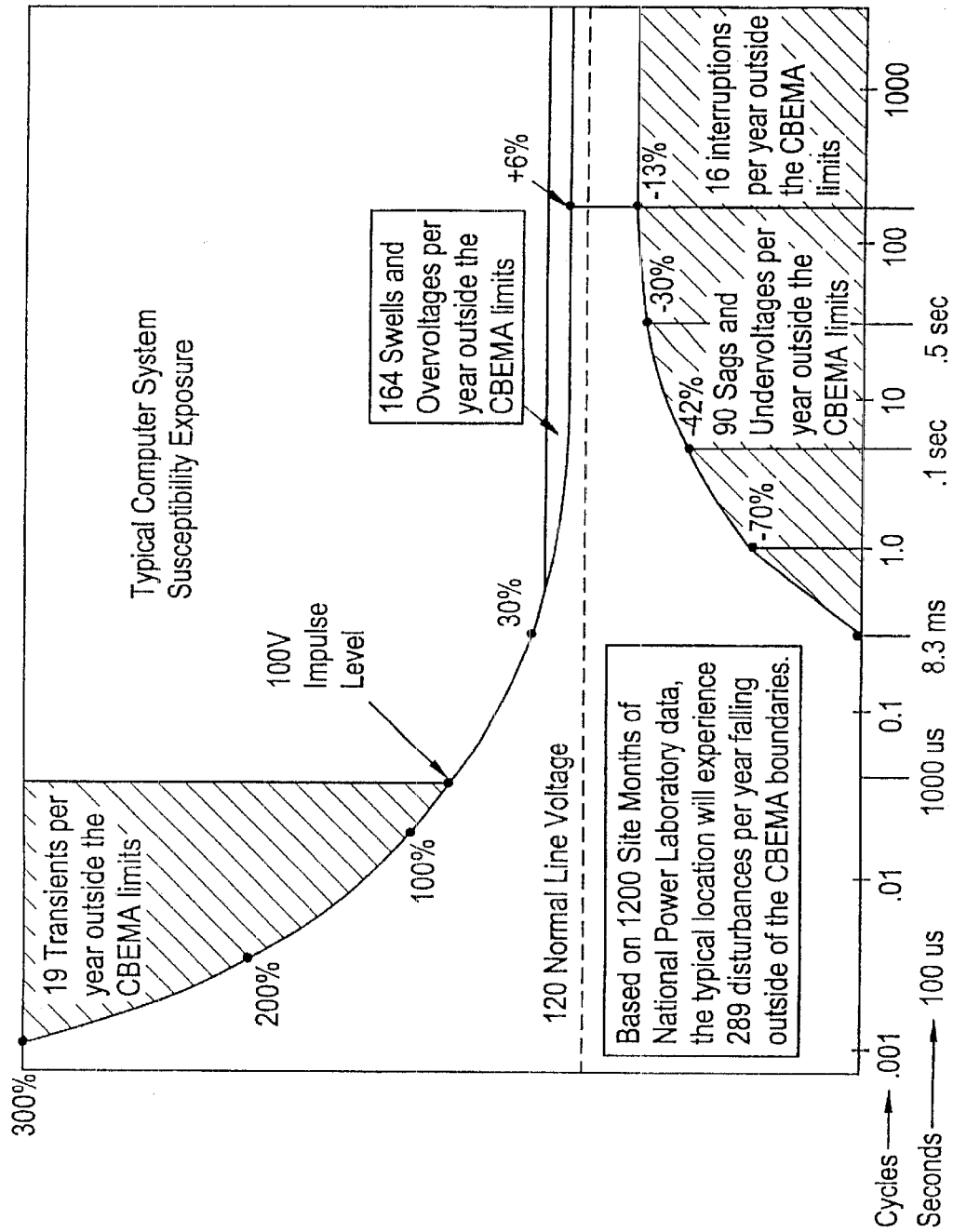
FIG. 1 is a graph illustrating the power reliability demand of modern computer equipment.
Figure 2A:
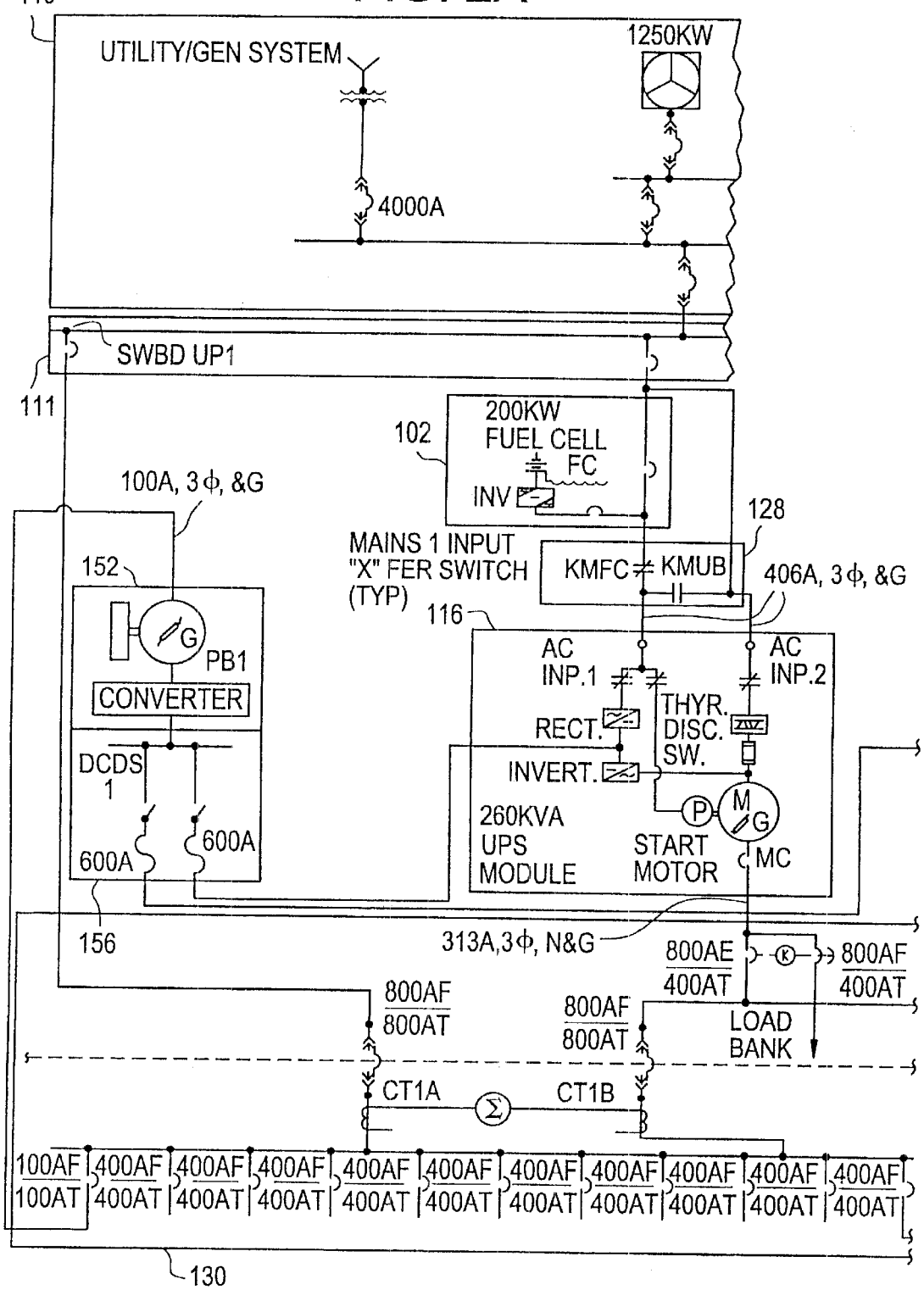
FIGS. 2A–2C are a block diagram of a power system including components of the present invention.
Figure 2B:
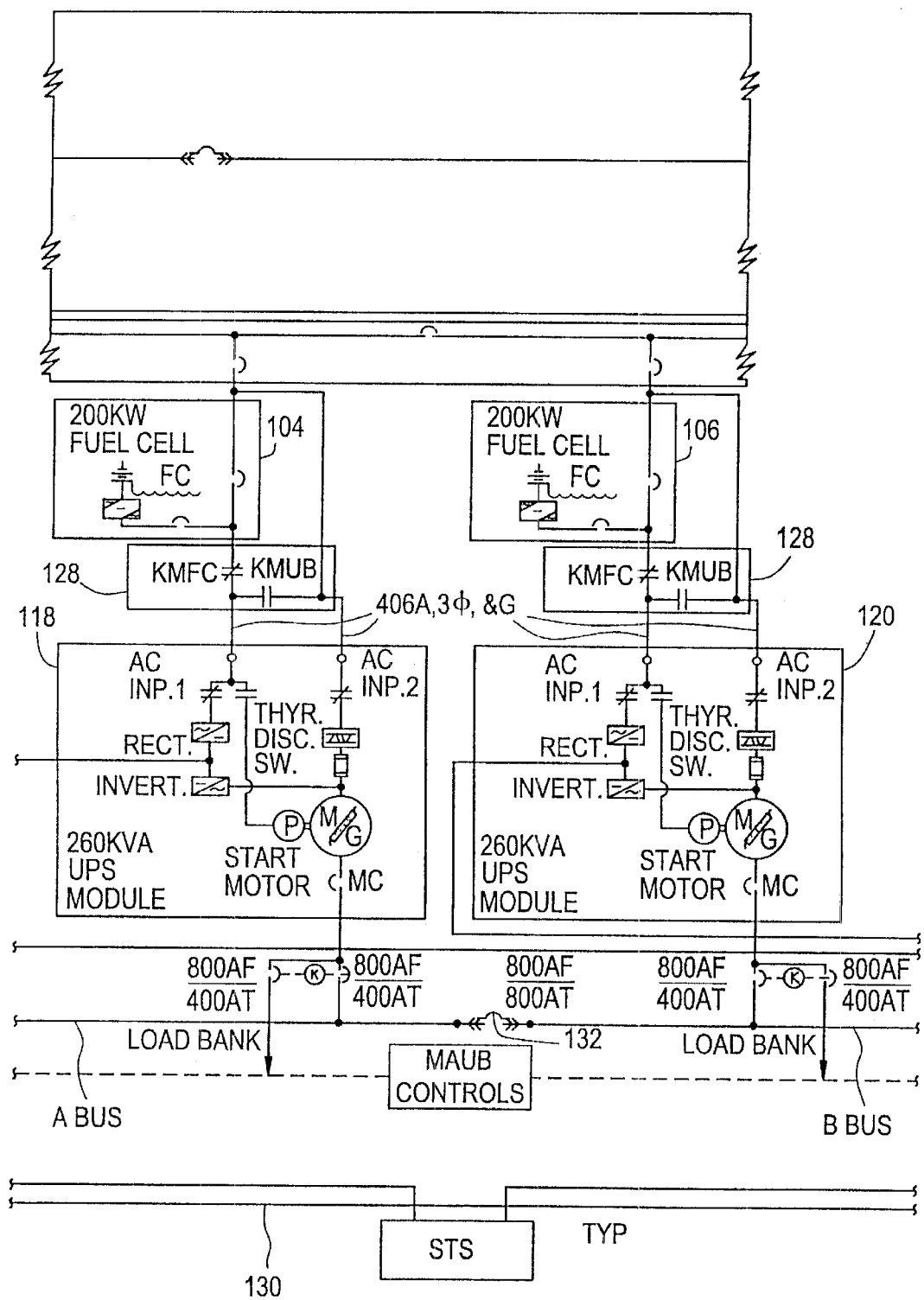
Figure 2C:
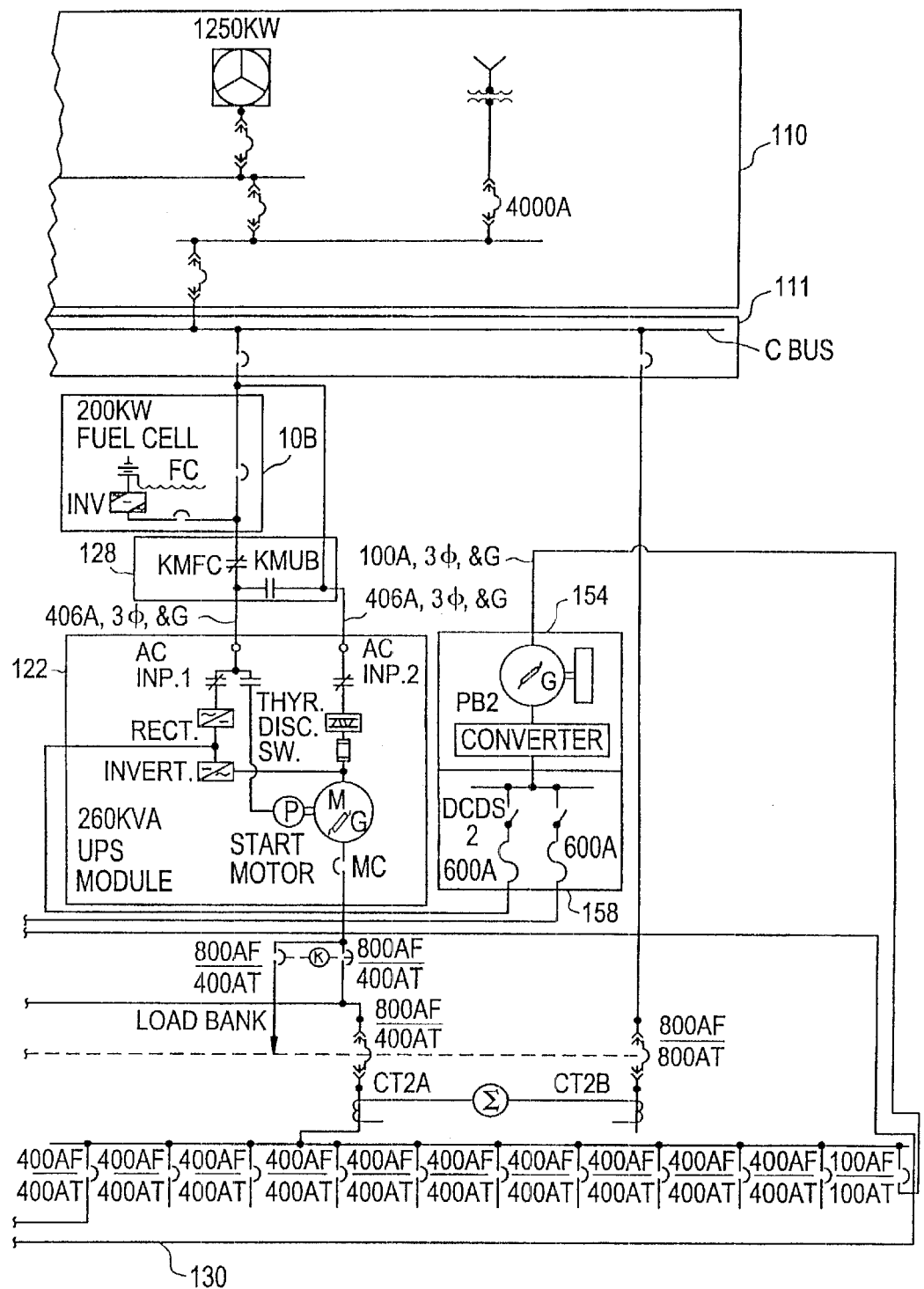

FIGS. 2A–2C are a block diagram of a power system in an exemplary embodiment of the invention. Components of the invention are described with reference to FIGS. 2A–2C but it is understood that FIGS. 2A–2C depict only an exemplary configuration. The system utilizes redundant sources of power in the form of power sources 102, 104, 106 and 108 and a secondary power system 110. The secondary power system 110 may include alternate power sources such as utility lines, generators, batteries, etc. The secondary power system 110 may also include fuel cells. The secondary power system 110 feeds a switchboard 111 or C bus. Power sources 102, 104, 106 and 108 may be fuel cells such as the PC25 available from Onsi Corporation. Although FIGS. 2A–2C depicts fuel cells as the power sources 102, 104, 106 and 108, it is understood that other power sources may be used and the invention is not limited to fuel cells. An advantage, however, of using fuel cells is that the fuel cells produce heat as a by product which can be used by the consumer to defray other costs. The embodiment shown in FIGS. 2A–2C is designed for use with a critical load requirement of 350 kw. Fuel cells 102 and 104 can supply the entire critical load through a first or A bus. Fuel cells 106 and 108 supply power to a second or B bus which can also supply the entire critical load if necessary (i.e. if the A bus is inoperative).

The C bus interfaces with the A Bus and B bus such that the C bus serves as an additional level of backup to the A bus and B bus. The C bus may supply A bus and B bus loads through a number of methods depending on customer wants and needs. These methods include but are not limited to (1) direct connection to the second or third source pole of an A bus or B bus automatic transfer switch or rotary device, (2) direct connection to the second or third source pole of an automatic transfer switch provided by the customer in proximity to the load, (3) through the second source pole of an A bus automatic transfer switch or rotary device via the output of an automatic transfer switch which has the B bus as its preferred source and the C bus as its second source, (4) through the second or third source pole of an A bus automatic transfer switch or rotary device via the output of an automatic transfer switch which has two or more utilities or other power sources as its input, and (5) automatic by pass directly to the A bus or B bus.

The system further comprises four rotary devices in the form of un-interruptible power systems (UPS) 116, 118, 120 and 122. A suitable UPS is the Uniblock-II brand sold by Piller. Each UPS includes a motor-generator to provide AC power to the critical load 114. Each UPS includes two inputs labeled AC input 1 and AC input 2. A transfer switch 128 is used to control the flow of power between a power source (e.g., 102), the utility/generator system 110 and the rotary device 116. Power flow during multiple modes of operation is described herein with reference to FIG. 3.

Due to the nature of the fuel cell to disconnect upon detection of power faults, rotary devices are used to stabilize fluctuations, clear faults and prevent the fuel cells from disconnecting. It is important to note that UPS's are not the only type of rotary devices that can be used to enhance voltage stability. Unlike rotating machines, commercially available fuel cell power modules have no inertia and current flow stops almost immediately after a control action takes place limited only by inductive storage in the output magnetics. To overcome this shortcoming, the system includes rotary devices. A rotary device is any rotary UPS, motor generator, motor, synchronous condenser, flywheel, or other device that can provide inertia for storing and discharging real or reactive power. During operation, power ebbs and flows from the rotary devices in coordination with power demand and power supply to stabilize system voltage.

Additional rotary devices may be used to provide power during certain conditions. As shown in FIGS. 2A–2C, a rotary device 152 is connected to UPS 116 and UPS 118 through switch 156. Rotary device 154 is connected to UPS 120 and UPS 122 through switch 158. In an exemplary embodiment, rotary devices 152 and 154 are flywheels such as the Powerbridge flywheel sold by Piller. Flywheels 152 and 154 are shown connected to AC input 1 but may also be connected to AC input 2. It is understood that a variety of rotary devices may be used. The number of flywheels or rotary devices can vary from one rotary device for all the UPS's to one rotary device per UPS. It is preferable to have at least two flywheels so that there is some redundancy in this component of the system. Additional flywheels may be necessary depending on the load requirements and the desired level of redundancy. Devices other than flywheels may be used to provide supplemental power to the UPS (e.g., generators, batteries, etc.).

As described in detail with reference to FIG. 3, the flywheels 152 and 154 provide DC power to an inverter located with each UPS in certain situations. The fuel cells 102, 104, 106 and 108 operate to disconnect from the C bus upon the detection of power faults on the C bus. When the fuel cell disconnects and enters the idle mode, the flywheel provides power so that there is no disturbance in the power to the UPS. When the fuel cell powers back up, the flywheel is used to provide a smooth load transition back on to the fuel cell. The UPS is programmed to transfer the load from the flywheel to the fuel cell gradually so that the fuel cell does not experience a step load and disconnect from the UPS. In addition, should a periodic load, such as a compressor, turn on, this could create a step load on the fuel cell causing the fuel cell to disconnect. In this situation, the flywheel is used to provide the extra power to the UPS thereby preventing the fuel cell from disconnecting. In short, the flywheel is used to provide additional short term power to provide smooth operation of the system.

The output of each UPS is fed to a paralleling switch board 130 where power from UPS 116 and UPS 118 is joined in parallel on an A bus and power from UPS 120 and UPS 122 is joined in parallel on a B bus. The system may include tie breakers which are electro mechanical breaker devices that allow two separate buses to be connected together for the purpose of sharing a load between the buses or for powering two or more buses normally powered by separate power sources if one of the sources fails. Tie breakers may be included on the input side of rotary devices to provide the option to power a rotary device from either one of two separate power sources. Tie breakers are included on the output side of the rotary devices and automatic transfer switches to allow one power source to power loads normally powered by separate sources from a single source if one of the sources fails. As shown in FIGS. 2A–2C, tie breaker 132 can connect the A bus to the B bus. From the parallel switch board 130, power flows to the critical loads.

Transfer switches used in the system may be electro-mechanical or static transfer switches. Static transfer switches typically contain silicon controlled rectifiers ("SCR"). The system may include measures to protect the automatic static transfer switch SCR from damaging current flow. The SCR included in the switching mechanism in commercially available automatic static transfer switches is frail compared to the switching mechanism in electro mechanical transfer switches. Fault current flowing through an automatic static transfer switch can be of such magnitude that the SCR will "burn-up" or otherwise be destroyed. An automatic static transfer switch with a damaged SCR can not function to transfer the load between or among its sources as intended by system design. The system may incorporate current limiting devices such as fuses and reactors at appropriate locations to prevent fault current that may flow through an automatic static transfer switch from reaching a level that may damage the SCR. Rotary devices may also be located downstream of the automatic static transfer switch to prevent fault current from flowing through the switch when appropriate to system design.

The system may include a monitor/manager to locally and remotely monitor conditions and performance, command system functions, change operating parameters, archive events, perform system diagnostics, and set and broadcast alarms. The monitor/manager provides two way communications between the system operator and the controllers for the fuel cell power modules, automatic static transfer switches, and rotary devices. The system operator locally or remotely via the monitor/manager can command changes to the operating parameters of the fuel cell power modules, automatic static transfer switches and rotary devices. The monitor/manager through programming logic also can command such changes automatically. The system control scheme is such that failure of the monitor/manager will not disrupt power flow to the critical loads. The monitor/manager provides a "viewing window" for the customer to monitor operation of the system.

Figure 3:
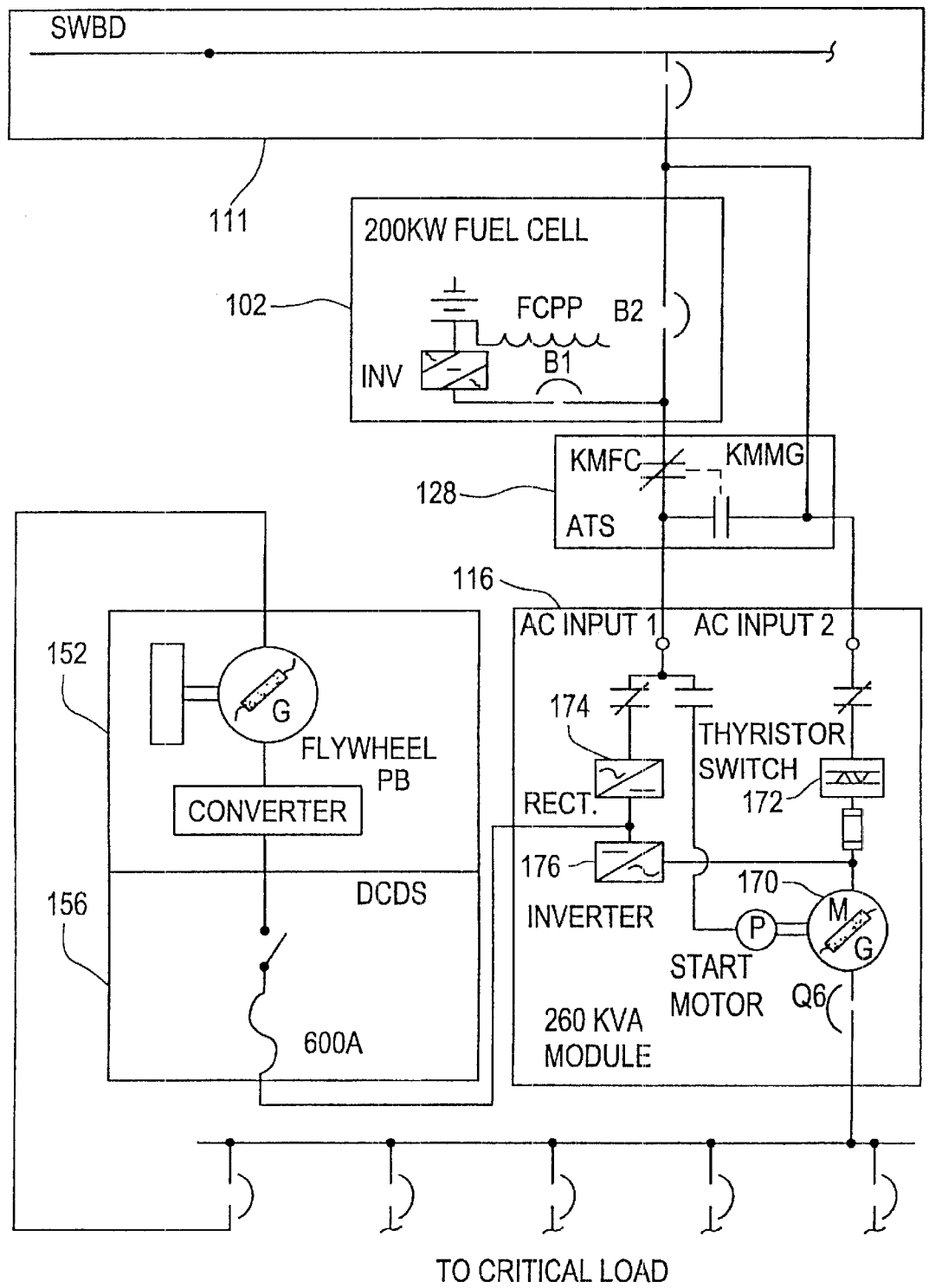
FIG. 3 is a block diagram of a portion of the power system of FIGS. 2A–2C.

FIG. 3 is a block diagram of a portion of the power system of FIGS. 2A–2C. Operation of the power system in multiple modes is described with reference to FIG. 3. FIG. 3 depicts one power source 102, one transfer switch 128, one UPS 116 and one flywheel 152. It is understood that other components in the system operate as described with reference to the portion of the system shown in FIG. 3.

For economic purposes, the power source 102 is configured to operate in the grid connect mode when the utility grid is operating. In the grid connect mode, breakers B1 and B2 are closed and the power source 102 generates AC power which is synchronized with the utility grid via a connection at the switchboard 111. Power drawn by the UPS motor-generator 170 flows from the power source 102 through a thyristor switch 172 via AC input 2. Electricity generated by power source 102 in excess of the demand of the UPS 116 powers other building loads via the connection at the switchboard 111. This allows the power source 102 to be operated at full power regardless of UPS 116 power demand. Operating the power source 102 at full power enhances user economics by substituting low cost power source power for high cost utility power that would otherwise be consumed by non-critical building loads.

The transfer switch 128 is configured with switch KMFC closed and switch KMMG open to allow power generated by the power source 102 to flow to the AC input 1 to power motor-generator 170. While the power source is operating in the grid connect mode, the AC input 1 rectifier 174 and inverter 176 are on standby. Power will not flow to motor-generator 170 through AC input 1 until thyristor 172 turns off. The motor-generator 170 supplies energy to flywheel 152. In the grid connect mode, any standby generator is inoperative.

If the utility grid power fails, thyristor 172 turns off and switch B2 opens interrupting the grid connect mode of operation and stopping the flow of power source 102 power to AC input 2. When B2 opens, the power source 102 reconfigures to operate in the grid independent mode. This mode transition requires the power source 102 to interrupt power generation resulting in a loss of voltage to switch KMFC and AC input 1 for up to five seconds. During this transition, the AC input 1 inverter 176 activates allowing flywheel 152 to power motor-generator 170. When the power source 102 begins generating electricity again, voltage returns to AC input 1 and the rectifier 174 activates. Power to the motor-generator 170 transfers from flywheel 152 to the power source 102 at a predetermined ramp rate. If an unstable power source re-establishes voltage on the switchboard 111, the power source 102 will not switch to the grid connect mode but will continue to operate in the grid independent mode powering motor-generator 170 via the rectifier 174/inverter 176 path and thyristor 172 remains off. In the grid independent mode, the power source 102 powers down to meet motor-generator 170 power demand only and no power source 102 generated electricity is supplied to other building loads. In grid independent mode, the UPS units 116, 118, 120 and 122 are synchronized through the rectifier 174 and inverter 176 components. In this way, the outputs of the UPS units 116, 118, 120 and 122 can be paralleled.

While operating in the grid independent mode, if the motor-generator 170 experiences a step load greater than a predetermined size, the flywheel 152 becomes the energy source for the motor-generator 170. The source of motor-generator 170 power transfers from the flywheel 152 to the power source 120 at a predetermined ramp rate. Accordingly, the power source 102 is not exposed to a sudden step load.

Three events take place before the power source 102 returns to grid connect mode. First, utility grid voltage is re-established on the switchboard. Second, any standby generator is shut down. Lastly, the flywheel 152 is recharged. At this time, the power source 102 monitors the utility feed for stability. The power source 102 transitions back to the grid connect mode of operation after determining that the grid voltage has been stable for a set period. This transition requires the power source 102 to interrupt generation for up to five seconds. When the loss of voltage at the rectifier 174 is detected, the rectifier 174 goes to standby. If at that moment the output of motor-generator 170 is not in synchronization with the utility grid, the inverter 176 will remain active allowing the flywheel 152 to power the motor-generator 170 until synchronization occurs. When synchronized, thyristor 172 turns on and the AC input 1 inverter 176 goes to standby allowing the utility grid to power the motor-generator 170 during the transition. The motor-generator 170 begins recharging the flywheel 152. When the power source 102 is ready for grid connect operation, B2 closes and the power source 102 ramps up to its maximum output and becomes the motor-generator 170 power source.

Should there be a disruption in utility grid voltage during a transition back to the grid connect mode of operation, the power source 102 will reconfigure for grid independent operation. With the loss of power on AC input 2, thyristor 172 turns off, the AC input 1 inverter 176 activates and the flywheel 152 powers the motor-generator 170. When voltage supplied by the power source 102 returns to the AC input 1 rectifier 174, the rectifier 174 activates and power to motor-generator 170 is ramped from the flywheel 152 to the power source 102. The motor-generator 170 recharges the flywheel 152.

Whenever the power source 102 shuts down or breaker B2 opens, the flow of power from power source 102 stops. The loss of power source 102 to AC input 2 is instantaneously replaced by backup utility grid power at the switchboard 111. Opening both B1 and B2 interrupts voltage on switch KMFC causing a timer to count down. If the power source 102 does not restore voltage to switch KMFC within a preset number of seconds, KMFC opens and KMMG closes thereby connecting AC input 1 to the backup power feed. This also isolates the power source 102. The AC input 1 rectifier 174 and inverter 176 remain on standby and the motor-generator 170 continues to be powered through thyristor 172.

If while the power source 102 is off-line the utility grid fails, thyristor 172 turns off and the AC input 1 inverter 176 activates allowing the flywheel 152 to power the motor-generator 170. Should the energy stored by flywheel 152 be depleted before the utility returns, the motor-generator 170 will shut down unless another power source comes on-line at the switchboard 111. When an unstable voltage source is detected on AC input 2, the rectifier 174 activates to feed power to the motor-generator 170 through the rectifier 174/inverter 176 path. The motor-generator 170 begins recharging the flywheel 152, otherwise the motor-generator 170 is powered via AC input 2. The combination of a power source 102, transfer switch 128, UPS 11 and flywheel 152 may be referred to as a power module. Utilizing redundant power modules (such as shown in FIGS. 2A–2C) eliminates the need for a non-utility power source when the utility grid fails while servicing an off line power source.

As described above, the exemplary power system can operate independent of the utility grid indefinitely. Commercially available fuel cell power modules are designed for long-term, grid independent operation. Redundant sources of natural gas in the form of independent redundant supplies from the local natural gas distribution company or on site storage of an alternative fuel source (i.e. liquefied natural gas, propane, methanol) provide for any disruption in the normal supply of natural gas. The components of the system are of utility grade designed for an economic life of twenty years or more. The modularity of the systems allows maintenance, overhaul, upgrade and expansion without disrupting power flow to the critical loads.

The exemplary power system also has no single points of failure. The system is configured such that the failure of any fuel cell power module, automatic transfer switch or rotary device will not disrupt power flow to the critical loads. Redundant fuel cell power modules comprise the B bus. In configurations that do not include a B bus, redundant fuel cell power modules are included in the A bus. Some configurations include redundant fuel cell power modules on the A bus along with the B bus. The automatic transfer switch and rotary devices have redundant power paths. System controllers typically have redundant processors and power supplies. Tie breakers provide for sharing power among buses if an automatic transfer switch or rotary device fails. Also, automatic transfer switches and rotary devices may include bypass circuits to provide fuel cell power directly to the load when such switches and rotary devices are off-line.

The exemplary power system synchronizes the frequency of all power sources in the system to a common reference source. The electrical outputs of all system power sources must have the same frequency, magnitude, and phase to allow rapid switching among the power sources without disrupting the load. The fuel cell power modules, rotary devices and automatic transfer switches contain synchronization circuits that allow the system to synchronize to a single reference. When a utility grid is interfaced with the system, the system is synchronized to the utility. If the utility fails, a secondary reference signal is substituted. When utility service is restored, it is unlikely to be synchronized with this secondary reference. When this occurs the power modules gradually adjust the phase and magnitude of their outputs to match the new utility source. When a utility grid is not interfaced with the system, a separate means of transmitting the reference signal is incorporated into the system.

One advantage of having the power sources connected to the utility grid is that power generated by the power sources (e.g. fuel cells) that is not consumed by the critical loads is directed to non-critical loads that are coupled to the utility grid. Thus, the user can operate the power sources above the requirement of the critical load and produce excess power to supplant power from the utility grid.

The exemplary power system also operates autonomously. No human intervention is required for normal operation. Each fuel cell power module, automatic transfer switch and rotary device operates automatically in accordance with the programming, functioning and sequencing of its own autonomous controller.

The exemplary power system can power loads that exceed the rated capacity of a single fuel cell power module. If the requirement for power exceeds the rated capacity of a single fuel cell power module, the load can be satisfied either of two ways or by combination of these ways: 1) by paralleling the outputs of multiple fuel cell power modules on a single bus to share load among the units; or 2) by paralleling the outputs of multiple rotary devices that are individually powered by fuel cell power modules.

The exemplary power system prevents faults from causing the fuel cell power modules to go to the idle mode thereby effectively shutting down power generation. The fuel cell power module's control system is designed to protect the fuel cell inverter from damage due to current overload resulting from a downstream fault. Commercially available fuel cell power modules can not supply adequate fault current to clear breakers. If the controller detects a current rise resulting from a fault that exceeds inverter parameters, it disconnects the unit from the load and initiates transfer to the idle mode. Rotary devices are incorporated at appropriate locations throughout the system downstream of the fuel cell power modules to provide fault current, thereby preventing the fuel cell power modules from ever seeing a fault condition.

The exemplary power system prevents step loads and overloads from causing the fuel cell power modules to go to the idle mode thereby effectively shutting down power generation. The fuel cell power module's control system is designed to protect the cell stack from events that may cause cell stack damage. If the controller detects a voltage collapse resulting from a step load or an overload, it disconnects the unit from the load and initiates transfer to the idle mode. The fuel and air supply valves on commercially available fuel cell power modules can not anticipate step loads. Commercially available fuel cell power modules can not carry overloads greater than 110% of rated capacity nor can they carry an overload for more than five seconds. Step loads and overloads can stress the cell stack causing voltage to collapse. Flywheels are incorporated at appropriate locations in the system to provide power for phasing step loads on line thereby allowing the fuel and air valves to adjust to settings appropriate to the load without shutdown. Flywheels are integrated with rotary UPS units to carry overloads up to 150% of rated capacity for two minutes thereby allowing an orderly transfer of an overload to an alternate power source.

The exemplary power system prevents transient overloads from causing the fuel cell power modules to go to the idle mode thereby effectively shutting down power generation. The fuel cell power module's control system is designed to protect the fuel cell from transient overloads that may damage the inverter. If the controller detects a transient overload greater that 110% of rated capacity, it disconnects the unit from the load and initiates transfer to the idle mode. Commercially available fuel cell power modules can not carry overloads greater than 110% of rated capacity nor can they carry any overload for more than five seconds. Transient overloads can cause the voltage to collapse. Flywheels are integrated with rotary UPS units to carry transient overloads up to 150% of rated capacity for two minutes.

The exemplary power system prevents load unbalance from causing the fuel cell power modules to go to the idle mode thereby effectively shutting down power generation. A 10% single phase current unbalance at rated load and 190% of rated current line to neutral cause unbalance overloads on commercially available fuel cell power modules. This condition will cause the fuel cell power module to disconnect from the load and initiate transfer to the idle mode. The motor generator and rotary UPS unit of choice have 100% capability for load unbalance. These rotary devices are located downstream of the fuel cell power modules to prevent the power modules from being exposed to a load unbalance condition.

Figure 4A:
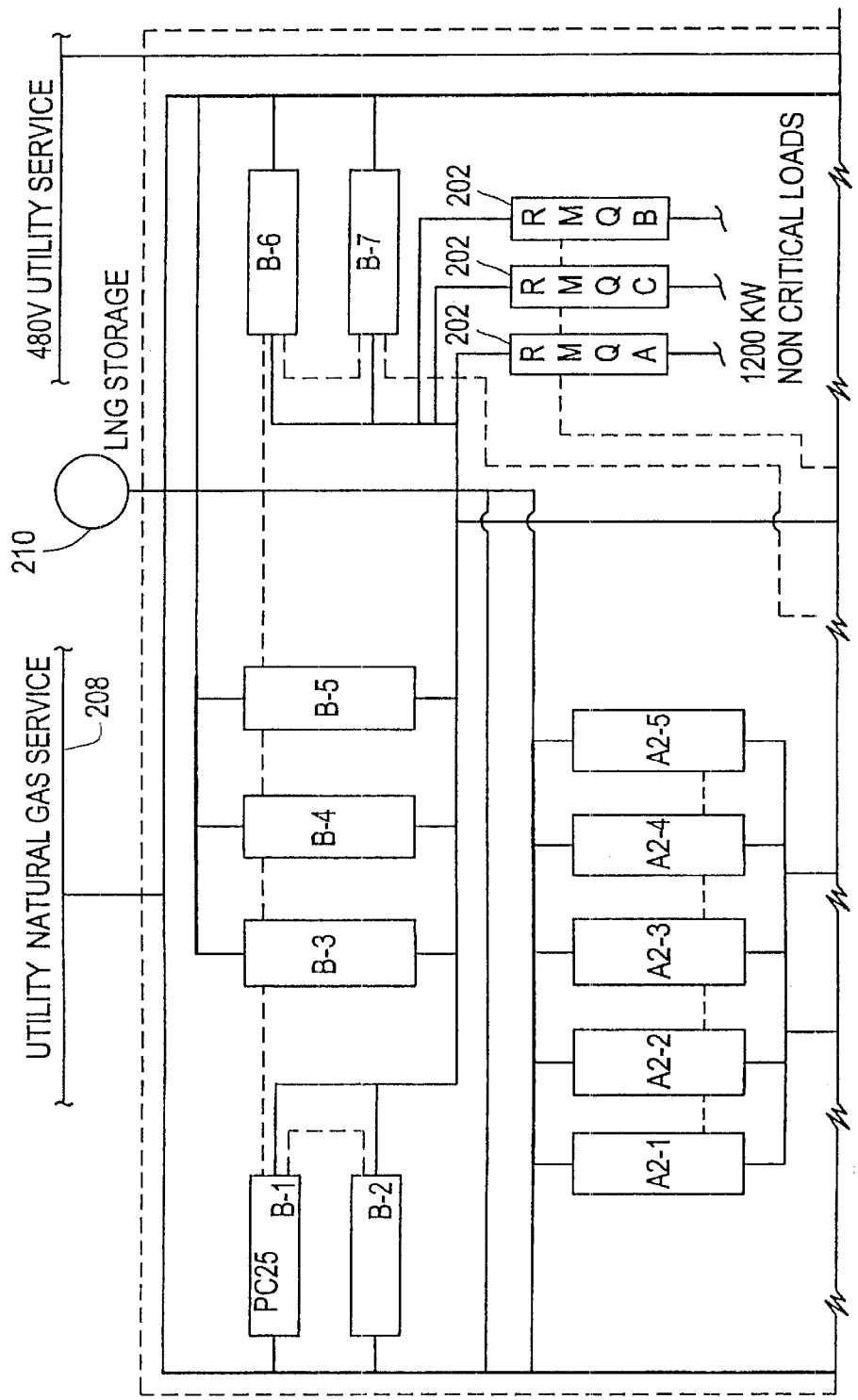
FIGS. 4A–4B are a block diagram of a power system including components of the present invention.
Figure 4B:
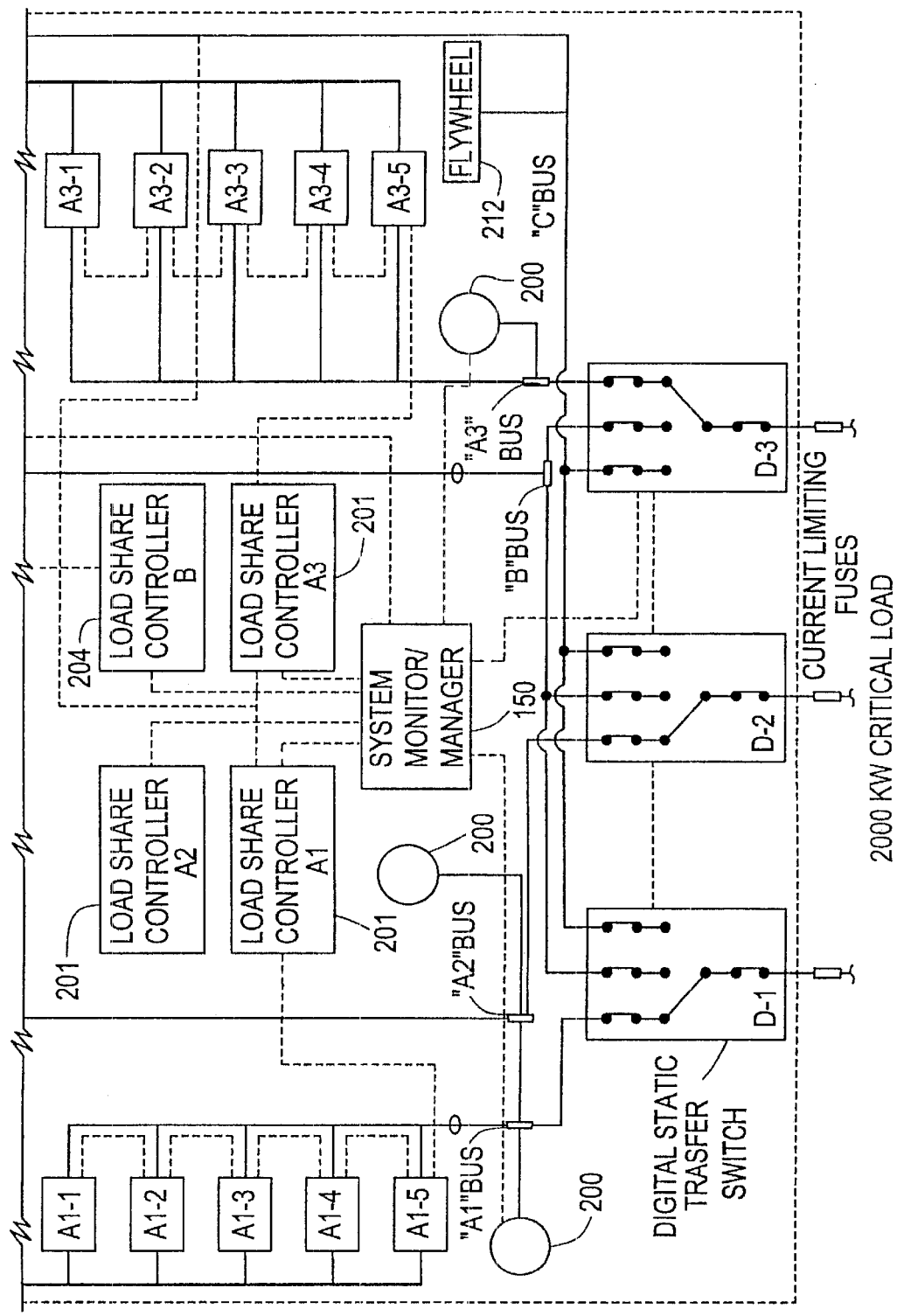

FIGS. 4A–4B are a diagram of an alternative power system including three independent primary buses labeled A1, A2 and A3. Each A bus is supplied by a bank of 5 fuel cells A1-1 to A1-5, A2-1 to A2-5, and A3-1 to A3-5. The banks of five fuel cells are connected in parallel in a load sharing configuration. The rotary device associated with each primary bus is a synchronous condenser 200. A load share controller 201 is associated with each bus A1, A2 and A3 and provides control signals to the fuel cells to ensure proper load sharing. The secondary or B bus is supplied by 7 fuel cells B-1 to B-7 which are coupled in parallel in a load sharing configuration. A load share controller 204 is coupled to the B bus to provide control signals to the fuel cells and ensure proper load sharing. A plurality of motor generator units 202 are powered by the B bus and supply power to non-critical loads while isolating the fuel cells B-1 to B-7 from the critical loads. A system monitor/manager 150 is also provided and serves the same purpose as described above with reference to FIGS. 2A–2C. A utility source of power provides the C bus. A flywheel 212 is connected to the C bus to provide ride through power for voltage sags. A series of static transfer switches D1, D2 and D3 select the appropriate source so that critical loads receive un-interrupted power.

As shown in FIGS. 4A–4B, the secondary or B bus serves as backup to the A bus. When not supplying electricity to the critical load, the B bus can supply power to other facility loads ("non-critical loads") through one or more customer feeders. Typically, B bus feeders are connected to the B bus via automatic transfer switches. However, the B bus may employ one or more rotary devices depending on the parameters of the system's configuration and wants and needs of the customer. The B bus may be unitized or segmented depending on customer wants and needs. The B bus interfaces with the critical loads through the second source pole on automatic transfer switches D1–D3 or through rotary devices such as rotary UPS. Also, a synchronous condenser may be located on the output of the automatic transfer switch.

To add additional redundancy, two sources of natural gas are provided for the fuel cells. A utility natural gas source 208 and a second local natural gas storage device 210 are used to provide redundant natural gas supply to the fuel cells.

The exemplary power system prevents cascade failure of the fuel cell power modules. Segmentation of the A Bus and the incorporation of a segregated B Bus and C Bus provide barriers to cascade failures. In some configurations, automatic transfer switches are programmed not to transfer faults. Automatic transfer switches, motor generator and rotary UPS units can be used to isolate loads from each other. Motor generator units and rotary UPS units also isolate the fuel cell power modules from the loads and each other. Isolating the fuel cell power modules from events that may cause the power modules to fail or transfer to the idle mode prevents cascade failure.

Figure 5:
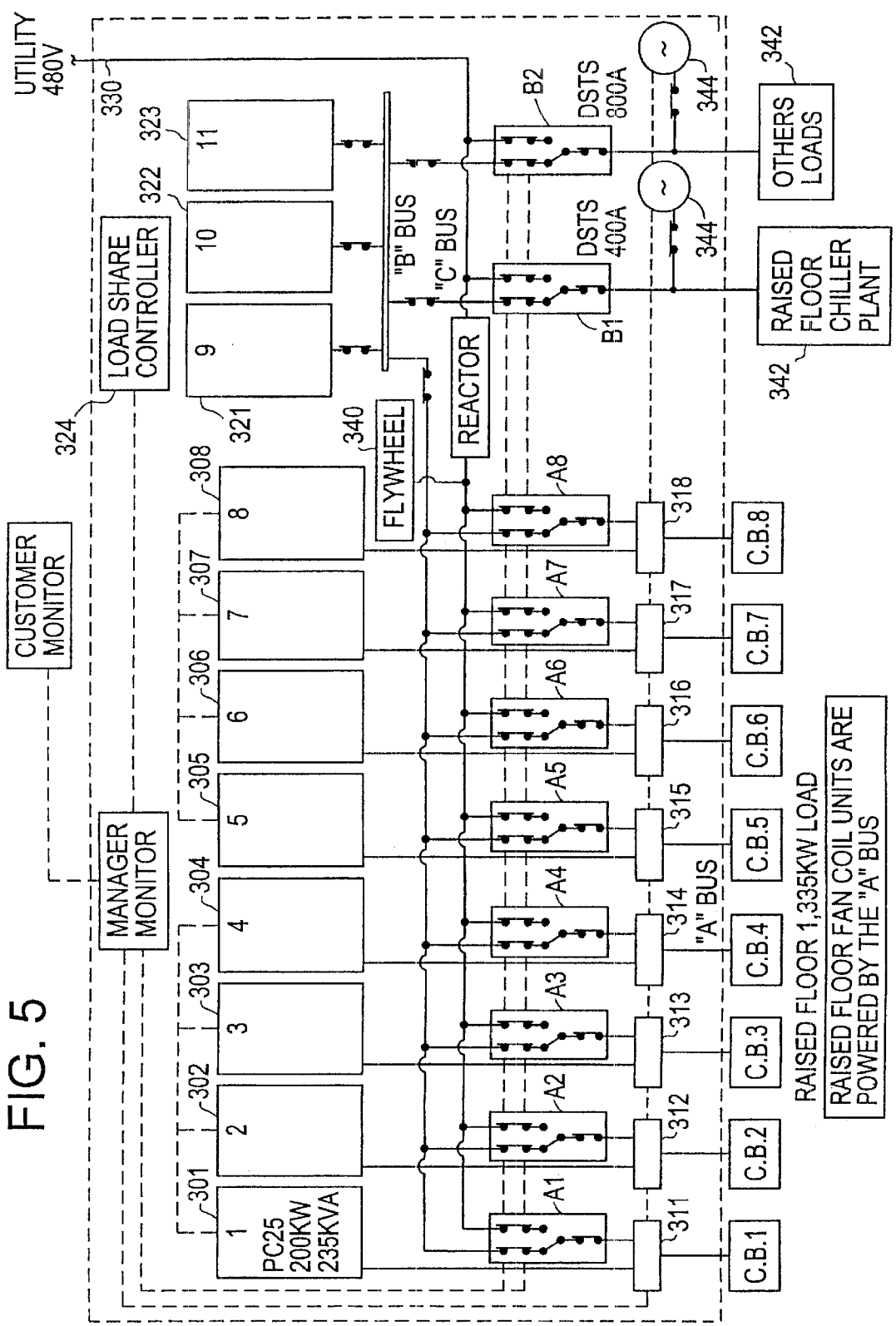
FIG. 5 is a block diagram of a power system including components of the present invention.

FIG. 5 is a diagram of another power system including components of the present invention. As shown in FIG. 5, the primary or A bus is comprised of 8 individual power sources (e.g. fuel cells). Each power source 301–308 is connected to a rotary device 311–318 such as a UPS sold by Piller. The secondary or B bus is formed by three power sources 321–323 connected in parallel and controlled by a load share controller 324. The C bus is provided by a utility line 330. A flywheel 340 is connected to the C bus.

The B bus and the C bus are connected to respective poles of automatic transfer switches A1–A8. The automatic transfer switches A1–A8 select the better power source between the B bus and the C bus for supply to the rotary devices 311–318. The output of each rotary device 311–318 is coupled to one of eight critical loads CB1–CB8. The rotary devices are programmed to prefer the A bus power sources 301–308. The B bus and the C bus are also connected to respective poles of automatic transfer switches B1 and B2 which direct power to other loads. The rotary device associated with the loads 342 are synchronous condensers 344. The system of FIG. 5 is another example of a power system utilizing redundant power sources, rotary devices and automatic transfer switches to provide reliable power to critical loads.

FIGS. 2A–2C, 4A–4B and 5 illustrate various configurations of redundant power sources, rotary devices and automatic transfer switches to provide a high reliability power system. The primary and secondary bus configuration and the type, size and number of power sources, rotary devices and automatic transfer switches are determined by the size of the load, the number of feeders required and the system availability desired by the user (i.e. how reliable does the consumer require the power).

FIG. 6 is a diagram of an alternative fuel cell 500 in accordance with the present invention. The fuel cell 500 differs from conventional fuel cells in its output portion 510. The output portion 510 includes a DC to DC converter 512 which provides an output to a rotary motor-generator 514. The DC to DC converter 512 may be implemented using a DC to DC motor. Fuel cell stack voltage decreases as load increases. The DC to DC converter 512 is designed to maintain constant voltage while load on the motor generator 514 varies. The motor generator 514 produces an AC output and allows the fuel cells 500 to be easily connected in parallel for load sharing. The conventional fuel cells cannot be connected in parallel without load sharing controllers which are complex. The output of fuel cell 500 can be connected in parallel with other similar fuel cells without the need for complex load sharing controllers. In addition, because the motor-generator 514 is capable of generating fault clearing currents, the fuel cell 500 need not disconnect from the system upon detection of a fault. The motor generator 514 isolates the fuel cell 500 from harmful currents. In an alternative embodiment, the motor-generator 514 includes a second input for receiving an additional power source.

As described above, the power sources described herein are not limited to fuel cells but may also include microturbines, turbines, reciprocating engines, generators and other types of power sources, and combinations of different types of power sources.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A power system for providing power to a load, the system comprising:
   a first power source;
   a second power source, independent of said first power source;
   a rotary device having a primary power input circuit and a secondary power input circuit, said primary power input circuit and said secondary power input circuit providing power to a motor generator in said rotary device;
   said second power source coupled to said rotary device at said secondary power input circuit; and,
   a transfer switch for selectively coupling said first power source to said primary power input circuit and said secondary power input circuit.

2. The power system of claim 1 wherein said first power source comprises a fuel cell and said second power source is the electric utility grid.

3. The power system of claim 1 wherein said second power source comprises an on-site generator.

4. The power system of claim 1 wherein said second power source comprises a fuel cell.

5. The power system of claim 1 wherein said rotary device comprises a rotary condenser.

6. The power system of claim 1 wherein a third power source is coupled to said rotary device.

7. The power system of claim 6 wherein said third power source is parallel connected with said first power source at the first power input circuit.

8. The power system of claim 6 wherein said third power source is parallel connected with said second power source at the second power input circuit.

9. The power system of claim 6 wherein said third power source comprises a flywheel.

10. The power system of claim 6 wherein said third power source comprises a generator.

11. The power system of claim 6 wherein said third power source comprises electric storage batteries.

12. A power system for providing power to a load, the system comprising:

a first power module including:
- a first power source;
- a second power source, independent of said first power source;
- a rotary device having a primary power input circuit and a secondary power input circuit;
- said second power source coupled to said rotary device at said secondary power input circuit; and,
- a transfer switch for selectively coupling said first power source to said primary power input circuit and said secondary power input circuit; and;

a second power module including:
- a first power source;
- a second power source, independent of said first power source;
- a rotary device having a primary power input circuit and a secondary power input circuit;
- said second power source coupled to said rotary device at said secondary power input circuit; and,
- a transfer switch for selectively coupling said first power source to said primary power input circuit and said secondary power input circuit.

13. The power system of claim 12 further comprising:

a common bus coupled to an output of said first power module and coupled to an output of said second power module.

14. The power system of claim 12 further comprising:

a first bus coupled to an output of said first power module; and, a second bus, independent of said first bus, coupled to an output of said second power module.

15. The power system of claim 14 further comprising:

a tie-breaker included between said first and second independent buses.

* * * * *